US010567379B2

(12) United States Patent
Isola et al.

(10) Patent No.: US 10,567,379 B2
(45) Date of Patent: Feb. 18, 2020

(54) NETWORK SWITCH PORT ACCESS CONTROL AND INFORMATION SECURITY

(71) Applicant: BANK OF AMERICA CORPORATION, Charlotte, NC (US)

(72) Inventors: Rahul Isola, Charlotte, NC (US); Anthony P. Grossi, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 15/633,494

(22) Filed: Jun. 26, 2017

(65) Prior Publication Data
US 2018/0375862 A1    Dec. 27, 2018

(51) Int. Cl.
| | |
|---|---|
| *H04L 12/22* | (2006.01) |
| *H04L 12/26* | (2006.01) |
| *H04L 29/06* | (2006.01) |
| *G06F 21/85* | (2013.01) |
| *H04L 12/741* | (2013.01) |
| *H04L 29/14* | (2006.01) |
| *H04L 12/935* | (2013.01) |

(52) U.S. Cl.
CPC ...... *H04L 63/0876* (2013.01); *H04L 63/0236* (2013.01); *H04L 63/08* (2013.01); *H04L 45/745* (2013.01); *H04L 49/3009* (2013.01); *H04L 63/0227* (2013.01); *H04L 63/108* (2013.01); *H04L 63/1433* (2013.01); *H04L 63/162* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 7,516,487 | B1 | 4/2009 | Szeto et al. |
| 7,523,485 | B1 | 4/2009 | Kwan |
| 7,562,390 | B1 | 7/2009 | Kwan |
| 7,735,114 | B2 | 6/2010 | Kwan et al. |
| 8,238,352 | B2 * | 8/2012 | Shim ............... H04L 63/101 370/401 |
| 8,239,929 | B2 | 8/2012 | Kwan et al. |

(Continued)

OTHER PUBLICATIONS

An Anomaly Traffic Detection Method Based on the Flow Template for the Controlled Network. Wang. ICOCN. (Year: 2016).*

(Continued)

*Primary Examiner* — Venkat Perungavoor
(74) *Attorney, Agent, or Firm* — Michael A. Springs

(57) ABSTRACT

A system that includes a switch, a network authentication server (NAS), and a threat management server. The NAS sends a device identifier for an endpoint device to the threat management server in response to the endpoint device connecting to a port on the switch. The threat management server determines the endpoint device is present in a blacklist based on the device identifier in response to receiving the device identifier. The threat management server determines the endpoint device is blocked from one or more second ports on the switch. The threat management server blocks the endpoint device from accessing the network via the first port on the switch in response to determining the endpoint device is blocked from the one or more other ports on the switch.

13 Claims, 6 Drawing Sheets

(56) References Cited

U.S. PATENT DOCUMENTS

| | | | |
|---|---|---|---|
| 8,380,828 B1 * | 2/2013 | Schlichter | H04L 63/0227 709/221 |
| 8,447,865 B2 | 5/2013 | Bansal et al. | |
| 8,453,227 B2 | 5/2013 | Aiello et al. | |
| 8,533,227 B2 | 9/2013 | Schneider | |
| 8,605,574 B2 * | 12/2013 | Wu | H04L 12/4625 370/221 |
| 8,938,782 B2 | 1/2015 | Sawhney et al. | |
| 8,949,827 B2 | 2/2015 | Becker et al. | |
| 8,984,504 B2 | 3/2015 | Becker et al. | |
| 9,553,891 B1 | 1/2017 | Isola et al. | |
| 2002/0032797 A1 * | 3/2002 | Xu | H04L 29/06 709/238 |
| 2006/0174342 A1 * | 8/2006 | Zaheer | G06F 21/56 726/23 |
| 2009/0044006 A1 * | 2/2009 | Shim | G06Q 10/107 713/151 |
| 2009/0172825 A1 * | 7/2009 | Yi | G06F 21/10 726/33 |
| 2011/0010769 A1 * | 1/2011 | Jarredal | H04L 63/0236 726/13 |
| 2011/0274110 A1 * | 11/2011 | Mmmadi | H04L 49/30 370/392 |
| 2013/0182721 A1 * | 7/2013 | Zhang | H04L 45/02 370/475 |
| 2015/0249666 A1 * | 9/2015 | Kato | H04L 63/08 726/7 |
| 2016/0164896 A1 * | 6/2016 | Baldonado | H04L 63/1425 726/23 |
| 2017/0126534 A1 * | 5/2017 | Cimino | H04L 67/2814 |
| 2017/0134429 A1 * | 5/2017 | Gustafsson | H04L 63/10 |
| 2017/0237769 A1 * | 8/2017 | Ookawa | H04L 45/26 726/22 |
| 2017/0264592 A1 * | 9/2017 | Yoda | H04L 45/745 |
| 2017/0318040 A1 * | 11/2017 | Wang | H04L 43/0876 |
| 2018/0212979 A1 * | 7/2018 | Nakamura | H04L 63/1416 |

OTHER PUBLICATIONS

Isola, R. et al., "Network Device Removal for Access Control and Information Security," U.S. Appl. No. 15/633,193, filed Jun. 26, 2017, 48 pages.

Isola, R. et al., "Untrusted Network Device Identification and Removal for Access Control and Information Security," U.S. Appl. No. 15/633,363, filed Jun. 26, 2017, 47 pages.

Isola, R. et al., "Network Device Isolation for Access Control and Information Security," U.S. Appl. No. 15/633,551, filed Jun. 26, 2017, 47 pages.

* cited by examiner

NETWORK SWITCH PORT ACCESS CONTROL AND INFORMATION SECURITY

TECHNICAL FIELD

The present disclosure relates generally to information security, and more specifically to network access control.

BACKGROUND

Many enterprises have expansive networks that include a large number of network devices. These network environments allow data to be shared among the different network devices. One of the technical challenges that occurs in a network environment is controlling data leakage and unauthorized access to data. For example, a bad actor (e.g. a hacker) may connect a network device to a network to extract data and/or to perform other malicious activities.

Identifying malicious network devices in a large network also poses several technical challenges. Conventional systems typically monitor the network for suspicious activity after a malicious network device is connected to the network. In these systems, since the malicious device is already connected to the network, the malicious network device is able to extract data and/or perform malicious activities before it is detected. Conventional systems are unable to preemptively identify malicious network device before they are connected to a network which limits their abilities to provide information security and to control and monitor data access within the network.

Without the ability to control or monitor data access and movement the system is vulnerable to having sensitive data leave the network and/or allowing malicious data (e.g. viruses and spyware) to enter the network. Thus, it is desirable to provide a solution that provides the ability to control and monitor data access and movement within a network.

SUMMARY

One of the technical challenges that occurs in a network environment is controlling data leakage and unauthorized access to data. For example, a bad actor may connect an unauthorized network device to a network to extract data and/or to perform other malicious activities. Identifying unauthorized network devices in a large network also poses several technical challenges. Conventional systems typically monitor the network for suspicious activity after an unauthorized network device has connected to the network. In these systems, since the unauthorized network device is already connected to the network, the unauthorized network device is able to extract data and/or perform malicious activities before it is detected. Conventional systems are unable to preemptively identify bad actors which limits their abilities to provide information security and to control and monitor data access within the network. Without the ability to control or monitor data access and movement the system is vulnerable to having sensitive data leave the network and/or allowing malicious data to enter the network.

The system described in the present application provides a technical solution that enables the system to identify unauthorized network device that are attempting to connect to a network and to block or control their access to the access to the network. The ability to identify, block, and control access to the network, improves the operation of the system and the security of the network. For example, the system is able to identify and block an unauthorized network device before the device is able to connect to the network and perform any malicious activities, for example, data exfiltration. Thus, the system provides an unconventional technical solution that allows the system to protect itself and the network from attacks by malicious devices.

In one embodiment, the system identifies and blocks untrusted network devices from accessing the network. When the system detects a network device has connected to a port on a switch and is failing authentication, the system uses stored historical information to determine whether the network device has been previously identified as an untrusted device. The system blocks the network device from accessing the network in response to determining that the network device has previously been identified as an untrusted device. The system provides a technical advantage by preventing the untrusted network device from accessing the network to perform any malicious activities. This allows the system to protect itself and the network from untrusted network devices connecting to the network.

In another embodiment, the system identifies and blocks untrusted network devices from accessing the network that have been previously been block from accessing the network. When the system detects a network device has connected to a port on a switch and is failing authentication, the system uses stored historical information to determine whether the network device has been previously been blocked from accessing the network. The system blocks the network device from accessing the network in response to determining that the network device has previously been blocked from accessing the network. The system provides a technical advantage by preventing the untrusted network device from reconnecting to the network after previously being blocked from the network. This allows the system to protect itself and the network from a bad actor that tries reconnecting a malicious network device to the network.

In another embodiment, the system identifies and blocks untrusted network devices from accessing the network that have been previously been block from one or more ports on a switch. When the system detects a network device has connected to a port on a switch and is failing authentication, the system uses stored historical information to determine whether the network device has been previously been blocked from any other ports on the switch. The system blocks the network device from accessing the network in response to determining that the network device has previously been blocked from one or more ports on the switch. The system provides a technical advantage by preventing the untrusted network device from reconnecting to the network after previously being blocked from the switch. This allows the system to protect itself and the network from a bad actor that keeps trying to use different ports on a switch to connect a malicious network device to the network.

In another embodiment, the system identifies and isolates untrusted network devices within a safe zone in the network which allows the untrusted network devices to be safely monitored without jeopardizing the network. When the system detects a network device has connected to a port on a switch and is failing authentication, the system uses stored historical information to determine whether the network device has been previously identified as an untrusted device. The system isolates the network device within a safe zone in the network in response to determining that the network device has previously been identified as an untrusted device. The system provides a technical advantage by allowing the untrusted network device to be monitored while preventing the untrusted network device from performing any malicious activities to the network. This allows the system to monitor and collect information about the untrusted network device and its activity without putting the network at risk.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
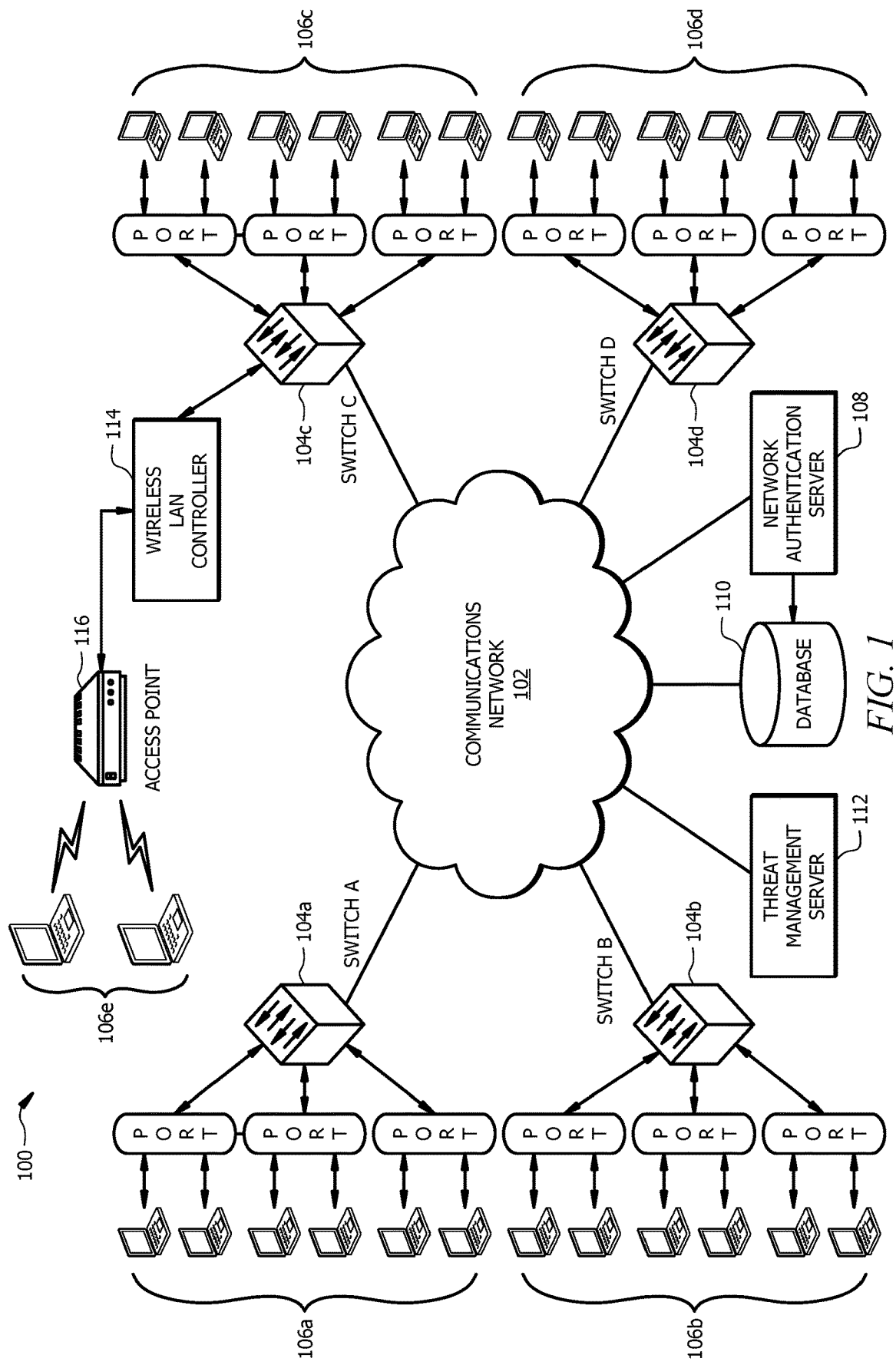
FIG. 1 is a schematic diagram of an embodiment of a system configured to implement network access control.

FIG. 1 is a schematic diagram of an embodiment of a system 100 configured to implement network access control. System 100 is generally configured to support a number of different operations, including but not limited to, identifying unknown or undesirable devices (e.g., non-compliant, rogue, or malicious devices), determining the location of the undesirable devices, collecting information from a switch connected to the undesirable devices, and blocking the undesirable devices from being able to access the network and/or isolate the undesirable in a safe zone within the network. For example, the system 100 is configured to detect when a bad actor connects a malicious device to port on a switch. The system 100 is configured to identify the malicious device and to block the malicious device from accessing the network. In other examples, the system 100 is configured to isolate and monitor malicious devices. Isolating and monitoring malicious devices allows the system 100 to collect information about malicious devices, which may be later used to further improve the security of the system 100.

In some embodiments, the system 100 is configured to authenticate a user, to determine disconnection capabilities of switches coupled to undesirable devices, to facilitate disconnecting undesirable devices, and to monitor the network for subsequent connection attempts by the undesirable devices to reconnect to the network. For example, the system 100 is configured to identify malicious devices that are attempting to connect to the network and to block the malicious devices from accessing the network. Detecting, removing, and blocking malicious devices from the network allow the system 100 to enhance network security by providing improved data access control. In some embodiments, these tasks may be performed by a particular device, such as a threat management server 112. In other implementations, these tasks may be performed in a distributed fashion using various components that interact with each other over a network.

System 100 comprises switches 104, endpoint devices 106, a network authentication server (NAS) 108, a database 110, a threat management server 112, a wireless LAN controller 114, and an access point 116 interconnected by one or more networks, represented by communications network 102. System 100 may be configured as shown in FIG. 1 or in any other suitable configuration as would be appreciated by one of ordinary skill in the art upon viewing this disclosure.

The communications network 102 represents communication equipment, including hardware and any appropriate controlling logic, for interconnecting elements and facilitating communication between interconnected elements. The communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 102 may include any combination of gateways, routers, hubs, switches, access points, base stations, and any other hardware, software, or a combination of the preceding that may implement any suitable protocol. The communications network 102 may include other types of networks, including wireless or wired networks.

The communications network 102 is configured to interconnect the switches 104, the endpoint devices 106, the NAS 108, the database 110, the threat management server 112, the wireless LAN controller 114, and the access point 116. The use of the communications network 102 facilitates identifying, blocking, and/or monitoring of undesirable devices regardless of the geographic location or communication protocols employed by network components or devices on the network. While only one communications network 102 has been illustrated, it should be understood that other embodiments may operate using multiple communications networks 102. In addition, other embodiments may employ one or more wired and wireless networks in communications networks 106.

System 100 comprises switches 104a, 104b, 104c, and 104d operably coupled to the communications network 102. The switches 104 represent communication equipment, including hardware and any appropriate controlling logic, for interconnecting and facilitating data communication to and from endpoint devices 106. Examples of switches 104 include, but are not limited to, gateways, call managers, routers, hubs, switches, access points, base stations, cellular towers, radio networks, satellite telephone equipment implementing appropriate protocols for wireless telephony communications. While only a select number of switches 104 have been illustrated, it should be understood that other embodiments may operate using any suitable number of switches 104. In addition, other embodiments may incorporate switches 104 in other wired or wireless networks coupled to the communications network 102 of system 100.

The access point 116 is any network hardware device (and accompanying software) that allows an endpoint device 106 to connect to the communications network 102. An example of the access point 116 includes, but is not limited to, a router. The access point 116 may allow for both wireless connections and wired connections to the communications network 102. For example, an endpoint device 106 may connect wirelessly to the access point 116 or may connect to the access point 116 via a wired connection (e.g. an Ethernet cable). The system 100 may comprise any suitable number of access points 116.

The wireless LAN controller 114 is configured to control and manage the access points 116. For example, the wireless LAN controller 114 may configure the access points 116 to connect to communications network 102. In some embodiments, the wireless LAN controller 114 may screen wireless connection attempts to the communications network 102 and may block attempts that are deemed suspicious or compromised. For example, the wireless LAN controller 114 may maintain a blacklist that identifies endpoint devices 106 that should be blocked from connecting wirelessly to the communications network 102. The wireless LAN controller 114 can connect to the access point 116 and vice versa to allow for end point devices 106 to connect to the communications network 102 via the access point 116 and wireless LAN controller 114. In FIG. 1, the wireless LAN controller 114 is shown operably coupled to a single access point 116. In other examples, the wireless LAN controller 114 may be configured to manage and control any number of access points 116 of system 100.

System 100 comprises endpoint devices 106a, 106b, 106c, 106d, and 106e operably coupled to the communications network 102 through switches 104. The endpoint devices 106 represent any suitable hardware, including appropriate controlling logic and data, capable of connecting to and communicating data over a network. For example, endpoint devices 106 may include wired or wireless devices including, but not limited to, workstations, laptops or notebook computer systems, printers, Voice over Internet Protocol (VoIP) telephones, Internet Protocol (IP) phones, mobile telephones, advanced phones (e.g. smartphones), personal digital assistants (PDAs), wireless handsets, notebook computer systems, tablet computer systems, embedded devices, network sniffers, auxiliary devices, or the like. The endpoint devices 106 may be capable of transmitting and receiving any forms of media including, but not limited to, audio, video, images, text messages, and other data formats, and documents and accessing disparate network-based services.

The NAS 108 represents any appropriate combination of hardware, controlling logic, and data that facilitates user authentication, admission control and logging, policy enforcement, auditing, and security associated with the communications network 102. In some embodiments, the NAS 108 may represent a networked server or collection of networked servers. The NAS 108 may be directly or indirectly coupled to other systems such as the database 110 to store and retrieve information related to network access control and authentication. In one embodiment, the NAS 108 is configured to track attempted and actual connections by endpoint devices 106 to the communications network 102 using switches 104. For example, the NAS 108 may monitor and track the MAC address and/or IP address associated with endpoint devices 106 on communications network 102 and the IP address and/or port of the switch 104 coupled to those endpoint devices 106.

The NAS 108 is configured to authenticate endpoint devices 106 that are connected to a port of a switch 104. The NAS 108 may authenticate endpoint device 106 using an 802.1X protocol, a MAC authentication Bypass (MAB) whitelist, or any other suitable protocol. For example, the NAS 108 may be configured to determine whether the MAC address of an endpoint device 106 is present in a MAB whitelist. The NAS 108 may authenticate the endpoint device 106 when the endpoint device 106 is present in the MAB whitelist. The NAS 108 may also be configured to automatically fail authentication for endpoint devices 106 that are present in a blacklist. In one embodiment, the NAS 108 is configured to send a device identifier identifying an endpoint device 106 in response to the endpoint device 106 connecting to the switch 104. In another embodiment, the NAS 108 is configured to send a device identifier identifying an endpoint device 106 in response to the endpoint device 106 in response to the endpoint device 106 failing authentication.

In certain implementations, the NAS 108 may log appropriate information about each network access attempt by endpoint devices 106 by communicating with database 110 and/or the threat management server 112. For example, the NAS 108 may log information about endpoint devices 106 that pass or fail authentication in a device log file. Additional information about a device log file is described in FIG. 2. In one embodiment, the functionality of the NAS 108 may be provided by a third-party data server. In particular embodiments, the activity recorded at the NAS 108 may be accessed by a log server (not shown) and utilized as an intermediate data repository.

The database 110 comprises suitable hardware and software, including memory and control logic, for storing, accessing, retrieving, and communicating various types of information, for example, network activity data. The database 110 may include any suitable combination of volatile or non-volatile, local or remote devices suitable for storing and maintaining information. For example, the database 110 may include random access memory (RAM), read only memory (ROM), solid state storage devices, magnetic storage devices, optical storage devices, or any other suitable information storage device or a combination of such devices. In one embodiment, the database 110 represents a relational database for storing connection logs and network activity logs of endpoints 106 in a retrievable manner. The database 110 may represent a database service provided by a third-party. In one embodiment, the database 110 may represent a database for storing all connection details related to endpoint devices 106. For example, the database 110 may maintain network activity information such as IP addresses/MAC addresses associated with endpoint devices 106 and IP addresses of switches 104 coupled to particular endpoint devices 106. The database 110 may also maintain port information (e.g. port addresses) for switches 104 or endpoint devices 106. The database 110 may be directly or indirectly coupled to other systems such as the NAS 108 and be capable of storing and retrieving information related to network access based on instructions from the NAS 108. In particular embodiments, the storage and functionality of database 110 may be provided by a third party data server. In some embodiments, the database 110 may reside on an network authentication server, such as the NAS 108.

The threat management server 112 represents any appropriate combination of hardware, controlling logic, and data for facilitating blocking endpoint devices 106 and/or active monitoring of endpoint devices 106. For example, the threat management server 112 may represent a networked server or collection of networked servers capable of communicating with other elements of the system 100 to monitor and prevent access to the network based on appropriate control logic. Additional information about the threat management server 112 is described in FIG. 2.

In particular embodiments, the threat management server 112 may comprise suitable memory to store lists of trusted and untrusted devices. For example, the threat management server 112 may maintain one or more whitelists that identify endpoint devices 106 which are known to be trustworthy. In addition, the threat management server 112 may maintain one or more blacklists that identify endpoint devices 106 which are known to be untrustworthy. In particular embodiments, the blacklists maintained by the threat management server 112 may include endpoint devices 106 that have previously been disconnected from the communications network 102. Additional information about whitelists and blacklists are described in FIG. 2.

In FIG. 1, the threat management server 112 is operably coupled to the communications network 102 to facilitate communication with other elements of the system 100. For example, the threat management server 112 may retrieve information from the NAS 108, the database 110, and/or switches 104 to prevent allowing network access to undesired endpoint devices 106. In particular embodiments, the functionality of the threat management server 112 may be provided by a third party data server. In some embodiments, the threat management server 112 may reside on another data server or its functionality may be provided by another data server, such as the NAS 108.

In one embodiment, using an appropriate user interface, the threat management server 112 may be accessed to initiate identifying, blocking, and/or isolating an endpoint device 106. As an example, the user interface may be an interface accessible through a web browser or an application on an endpoint device 106. In one embodiments, the threat management server 112 may access the NAS 108 and/or the database 110 to determine the IP address of the switch 104 coupled to the endpoint device 106 using its MAC address. In another embodiment, the threat management server 112 may transform the MAC/IP address of an endpoint device 106 into an IP address of the switch 104 coupled to the endpoint device 106. For example, the threat management server 112 may use a mapping function that transforms the MAC/IP address of the endpoint device 106 to the IP address of the switch 104 connected to the endpoint device 106. The threat management server 112 may employ any suitable mapping function or technique as would be appreciated by one of ordinary skill in the art. In other embodiments, the threat management server 112 may use any other technique to determine the IP address of the switch 104 connected to an endpoint device 106.

The threat management server 112 may use the IP address of the switch 104 to access the switch 104 to obtain information about the switch 104, for example port information and available features of the switch, and to issue commands to block the endpoint device 106, either logically or physically, from accessing the communications network 102. The threat management server 112 is configured to send one or more commands to logically and/or physically block or isolate the endpoint device 106 from the communications network 102.

In one embodiment, logically disabling or blocking an endpoint device 106 may involve blackholing the endpoint device 106. Blackholing refers to discarding or dropping frames associated with communications from a particular endpoint device 106. An example of the threat management server 112 sending commands to blackhole an endpoint device 106 is described in FIG. 3.

In another embodiment, disabling or blocking an endpoint device 106 may involve physically disconnecting an endpoint device 106 from the communications network 102. For example, the threat management server 112 is configured to send one or more disable commands that triggers a switch 104 to shut off electrical power to the port of the switch 104 that is connected to the endpoint device 106. In one embodiment, this process involves transforming the port from an active (e.g. ON) state to an inactive (e.g. OFF) state. Depending on the network architecture and the type of other endpoint devices 106 that are connected to the same port on the switch 104, physically disconnecting the port may be a viable option to disconnect an undesirable endpoint device 106 from accessing the communications network 102. An example of the threat management server 112 sending commands to disable an endpoint 106 device is described in FIG. 3.

In another embodiment, logically disabling or blocking an endpoint device 106 may involve rerouting data traffic associated with the endpoint device 106 to a safe zone. A safe zone refers to a network location that is deemed to be safe to receive traffic from an untrusted device. For example, a safe zone may represent an empty port or a port on a switch 104 that is connected to devices with acceptable levels of risk, such as a VoIP phone, a printer, or a display. Rerouting traffic associated with an endpoint device 106 to a safe zone mitigates the impact of malicious activity. In one embodiment, a safe zone may also be a network traffic monitoring server that enables live monitoring, recording, and/or forensic analysis of data traffic associated with an endpoint device 106. An example of the threat management server 112 sending commands to reroute an endpoint device 106 is described in FIG. 6.

In one embodiment, the threat management server 112 is configured to send one or more commands that triggers a switch 104 to reduce or limit the bandwidth or throughput of the port an endpoint device 106 is connected to. Reducing the bandwidth or throughput of the port the endpoint device 106 is connected to allows the endpoint device 106 to stay engaged with the communications network 102 in a safe manner which allows information to be collected about the endpoint device 106 and its activities. For example, the threat management server 112 may send a command to a switch 104 to reduce the bandwidth of the port connected to an endpoint device 106 and to reroute traffic associated with the endpoint device 106 to a safe zone for recording and/or forensic analysis. In this example, the endpoint device 106 has limited bandwidth which mitigates the impact of any malicious activities performed by the endpoint device 106 while data is collected about the endpoint device 106.

Figure 2:
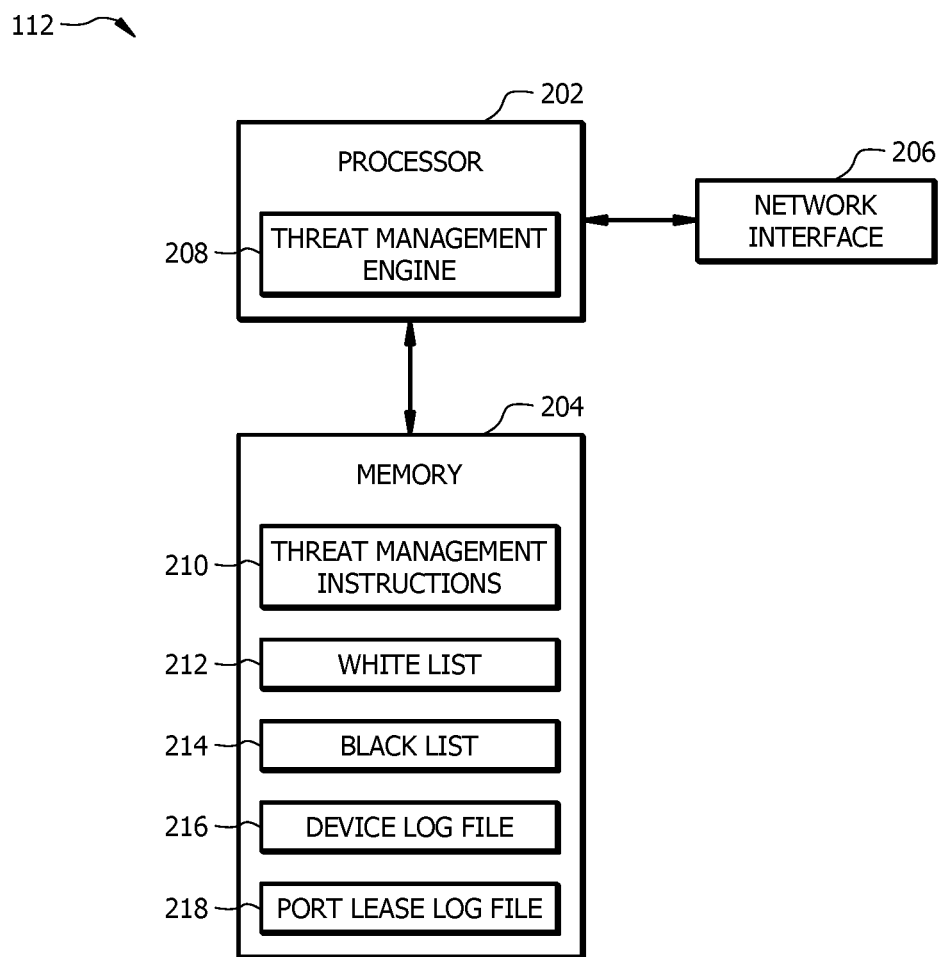
FIG. 2 is a schematic diagram of an embodiment of a threat management server.

FIG. 2 is a schematic diagram of an embodiment of a threat management server 112. The threat management server 112 comprises a processor 202, a memory 204, and a network interface 206. The threat management server 112 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a threat management engine 208. In an embodiment, the threat management engine 208 is implemented using logic units, FPGAs, ASICs, DSPs, or any other suitable hardware.

In one embodiment, the threat management engine 208 is configured to determine an undesirable endpoint device 106 is connected to a port of a switch 104 and to block the endpoint device 106 from accessing the communications network 102. In this example, the threat management engine 208 prevents undesirable devices from reconnecting to the communications network 102 which reduces the vulnerability of the system 100 to malicious activity performed by the undesirable device and provides improved network security. An example of the threat management engine 208 operating in this configuration is described in FIG. 3.

In another embodiment, the threat management engine 208 is configured to determine an undesirable endpoint device 106 that has previously been blocked from the communications network 102 is connected to a port of a switch 104 and to block the endpoint device 106 from accessing the communications network 102. In this example, the threat management engine 208 detects undesirable devices that have been previously blocked and prevents them from reconnecting to the communications network 102. An example of the threat management engine 208 operating in this configuration is described in FIG. 4.

In another embodiment, the threat management engine 208 is configured to determine an undesirable endpoint device 106 that has previously been blocked on a port of a switch 104 is connected to a different port of the switch 104 and to block the endpoint device 106 from accessing the communications network 102. In this example, the threat management engine 208 detects undesirable devices that have been previously blocked from one or more ports on a switch 104 and prevents them from reconnecting to the communications network 102 using a different port on the switch 104. For example, a bad actor may try to connect a malicious device to different ports of the switch 104 after the device has been blocked from one or more other ports of the switch 104. An example of the threat management engine 208 operating in this configuration is described in FIG. 5.

In another embodiment, the threat management engine 208 is configured to determine an undesirable endpoint device 106 is connected to a port on a switch 104 and to isolate the endpoint device 106 within a safe zone to allow the device to be monitored and tracked. In this example, the threat management engine 208 reduces or limits the bandwidth of the port on the switch 104, collects information about the undesirable device, and/or monitors the traffic associated with the undesirable device. An example of the threat management engine 208 operating in this configuration is described in FIG. 6.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, ternary content-addressable memory (TCAM), dynamic random-access memory (DRAM), and static random-access memory (SRAM). The memory 204 is operable to store threat management instructions 210, a whitelist 212, a blacklist 214, a device log file 216, a port lease log file 218, and/or any other data or instructions. The threat management instructions 210 comprise any suitable set of instructions, logic, rules, or code operable to execute the threat management engine 208.

The whitelist 212 identifies endpoint devices 106 which are known to be trustworthy and are allowed to access the communications network 102. The whitelist 121 may comprise information including, but not limited to, endpoint device identifiers, MAC addresses, IP addresses, switch identifiers, switch port addresses, time stamps, any other suitable type of information, and/or combinations thereof. An example of a whitelist 212 includes, but is not limited to, a MAB whitelist. In one embodiment, the system 100 (e.g. the NAS 108) is configured to automatically authenticate an endpoint device 106 that is present on the whitelist 212.

The blacklist 214 identifies endpoint devices 106 which are known to be untrustworthy and are prohibited from accessing the communications network 102. The blacklist 214 may comprise information including, but not limited to, endpoint device identifiers, MAC addresses, IP addresses, switch identifiers, switch port addresses, time stamps, any other suitable type of information, and/or combinations thereof. For example, the blacklist 214 may identify endpoint devices 106 blocked from accessing the communications network 102. The blacklist 214 may also identify ports on a switch 104 that an endpoint device 106 has been blocked from. In one embodiment, the system 100 (e.g. the NAS 108) is configured to automatically fail authentication for an endpoint device 106 that is present on the blacklist 214.

In one embodiment, the black list 214 identifies block timeout periods linked with device identifiers for endpoint device 106 that have been block from one or more ports on a switch 104. A block timeout period may indicate an amount of time an endpoint device 106 is blocked from a port and/or the switch 104. For example, a block timeout period may identify a time when the block timeout period expires. As another example, a block timeout period may identify an amount of time remaining until the block timeout period expires. In other examples, the block timeout period may use any other technique for indicating how long an endpoint device 106 is blocked from a port on the switch 104.

In one embodiment, the threat management engine 208 may set the block timeout period based on the number of times an endpoint device 106 has been blocked from a port and/or a switch 104. The block timeout period may increase each time an endpoint device 106 is blocked from a port and/or switch 104. For example, the block timeout period may be set to block the endpoint device 106 from connecting to a port for 15 minutes the first time the endpoint device 106 is blocked from the port. The block timeout period may be increased to block the endpoint device 106 from connecting to the port for 30 minutes the next time the endpoint device 106 is blocked from the port, and so on.

The device log file 216 identifies endpoint devices 106 that have either passed or failed authentication with the NAS 108. The device log file 216 may comprise information including, but not limited to, endpoint device identifiers, MAC addresses, IP addresses, switch port addresses, time stamps, any other suitable type of information, and/or combinations thereof. In one embodiment, an endpoint device identifier may be used with the device log file 216 to look-up and determine whether an endpoint device 106 linked with the device identifier has previously been authenticated or has previously failed authentication with the NAS 108.

The port lease log file 218 identifies endpoint devices 106 with a lease on a port of a switch 104. A port lease allows access to the communications network 102 via a particular port of a switch 104 for some period of time. A port lease may be set for thirty minutes, one hour, six hours, twenty four hours, or any other suitable period of time. The port lease log file 218 may comprise information including, but not limited to, endpoint device identifiers, MAC addresses, IP addresses, switch identifiers, switch port addresses, port lease periods, time stamps, any other suitable type of information, and/or combinations thereof. For example, an endpoint device identifier may be used with the port lease log file 218 may be used to look-up and determine whether an endpoint device 106 linked with the identifier has an active port lease. The port lease log file 218 may also identify the switch 104 and the port where the port lease is active.

The network interface 206 is configured to enable wired and/or wireless communications. The network interface 206 is configured to communicate data through the system 100, the communications network 102, and/or any other system or domain. For example, the network interface 206 may be configured for communication with a modem, a switch, a router, a bridge, a server, or a client. The processor 202 is configured to send and receive data using the network interface 206 from the communications network 102.

Figure 3:
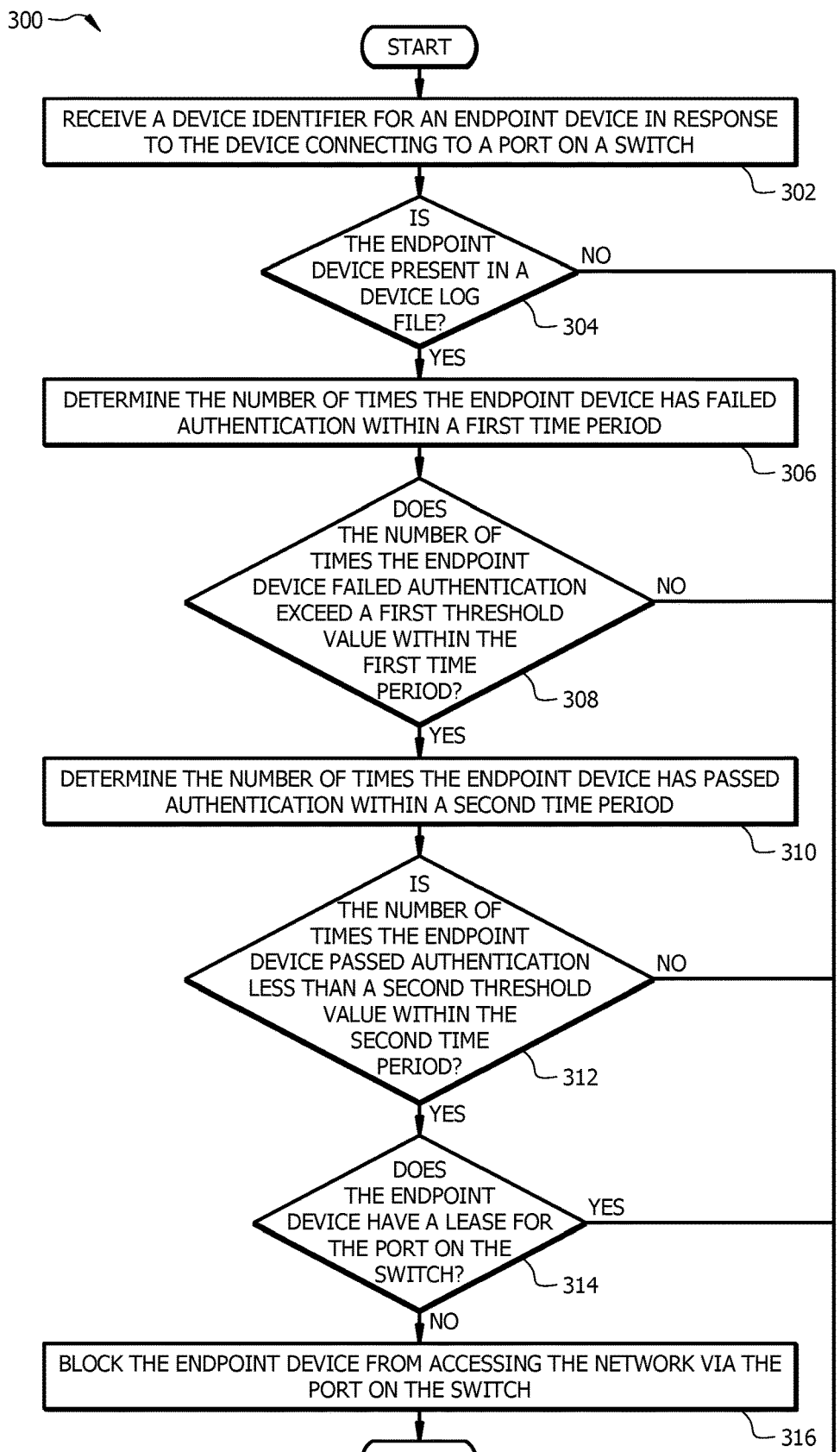
FIG. 3 is a flowchart of an embodiment of a device removal method.

FIG. 3 is a flowchart of an embodiment of a device removal method 300. Method 300 is implemented by the threat management server 112 to identify endpoint devices 106 that connect to a switch 104 in the communications network 102 and to block endpoint devices 106 that are identified as untrusted devices from accessing the communications network 102.

In a conventional system, when a malicious endpoint device 106 is connected to a port of the switch 104, the endpoint device 106 is able to download and access information from the communications network 102. Conventional systems are unable to identify the endpoint device 106 and to establish an uplink connection with the endpoint device 106 when the endpoint device 106 fails authentication. In contrast, system 100 provides a mechanism for identifying and blocking the malicious endpoint device 106 from accessing the communications network 102.

A non-limiting example is provided to illustrate how the threat management server 112 implements method 300 to identify endpoint devices 106 and to block untrusted or malicious endpoint devices 106 from accessing the communications network 102. As an example, a user connects an endpoint device 106 to a port on a switch 104. The NAS 108 attempts to authenticate the endpoint device 106, but the endpoint device 106 fails authentication with the NAS 108. The threat management server 112 is used to identify the endpoint device 106 and to block the endpoint device 106 if the device is identified as an untrusted or malicious device.

At step 302, the threat management server 112 receives a device identifier for the endpoint device 106 in response to the device connecting to a port on a switch 104. In one embodiment, the NAS 108 collects information from the switch 104 about the endpoint device 106 to generate a device identifier for the endpoint device 106. Examples of device identifiers may include, but are not limited to, a MAC address of the endpoint device 106, an IP address of the endpoint device 106, a device type, a vendor, a port address for the switch, any other suitable information, or combinations thereof. The NAS 108 sends the device identifier for the endpoint device 106 to the threat management server 112. For example, the device identifier for the endpoint device 106 may comprise the MAC address for the endpoint device 106. In another embodiment, the threat management server 112 may request information about the endpoint device 106 from the NAS 108 and/or the database 110.

At step 304, the threat management server 112 determines whether the endpoint device 106 is present in a device log file 216. For example, the threat management server 112 may use the device identifier (e.g. MAC address) to look-up whether the endpoint device 106 is present in the device log file 216. The presence of the endpoint device 106 in the device log file 216 indicates that historical information about whether the endpoint device 106 has previously failed or passed authentication with the NAS 108 is available. The threat management server 112 proceeds to step 306 when the threat management server 112 determines that the endpoint device 106 is present in the device log file 216. The absence of the endpoint device 106 in the device log file 216 indicates that historical information about whether the endpoint device 106 has previously failed or passed authentication with the NAS 108 may not be available. The threat management server 112 terminates method 300 when the threat management server 112 determines that the endpoint device 106 is not present in the device log file 216.

At step 306, the threat management server 112 determines the number of times the endpoint device 106 has failed authentication with the NAS 108 within a first time period using the device log file 216. For example, the threat management server 112 may count the number of times the endpoint device 106 appears in the device log file 216 as failing authentication with the NAS 108 within the first time period. The first time period may be any predetermined amount of time. For example, the first time period may be fifteen minutes, thirty minutes, one hour, or any other amount of time. The first time period may be in seconds, minutes, hours, days, or in any other suitable time unit.

At step 308, the threat management server 112 determines whether the number of times the endpoint device 106 has failed authentication exceeds a first threshold value within the first time period. For example, the threat management server 112 may determine whether the endpoint device 106 has failed authentication at least ten times within the past 15 minutes. The threat management server 112 compares the number of times the endpoint device 106 has failed authentication within the first time period (e.g. 15 minutes) to the first threshold value (e.g. 10). In other examples, the threat management server 112 may use any other suitable value for the first threshold value. The threat management server 112 proceeds to step 310 when the number of times the endpoint device 106 has failed authentication exceeds the first threshold value. The threat management server 112 terminates method 300 when the number of times the endpoint device 106 has failed authentication does not exceed the first threshold value.

At step 310, the threat management server 112 determines the number of times the endpoint device 106 has passed authentication with the NAS 108 within a second time period using the device log file 216. For example, the threat management server 112 may count the number of times the endpoint device 106 appears in the device log file 216 as passing authentication with the NAS 108 within the second time period. The second time period may be any predetermined amount of time. In one embodiment, the second time period is a greater period of time than the first time period. For example, the first time period may be one hour and the second time period may be twenty four hours.

At step 312, the threat management server 112 determines whether the number of times the endpoint device 106 has passed authentication is less than a second threshold value within the second time period. For example, the threat management server 112 may determine whether the endpoint device 106 has passed authentication at least twice within the past 24 hours. The threat management server 112 compares the number of times the endpoint device 106 has passed authentication within the second time period to the second threshold value. In other examples, the threat management server 112 may use any other suitable value for the second threshold value. The threat management server 112 proceeds to step 314 when the number of times the endpoint device 106 has passed authentication is less than the second threshold value. The threat management server 112 terminates method 300 when the number of times the endpoint device 106 has passed authentication is at least the second threshold value.

At step 314, the threat management server 112 determines whether the endpoint device 106 has a lease for the port on the switch 104. For example, the threat management server 112 may use the device identifier (e.g. MAC address) with the port lease log file 218 to look-up and determine whether the endpoint device 106 has a lease for the port on the switch 104. The threat management server 112 proceeds to step 316 when the threat management server 112 determines that the endpoint device 106 does not have a lease on the port of the switch 104. The threat management server 112 terminates method 300 when the threat management server 112 determines that the endpoint device 106 has a lease on the port of the switch 104.

At step 316, the threat management server 112 blocks the endpoint device 106 from accessing the communications network 102 via the port of the switch 104. In one embodiment, the threat management server 112 sends a blackhole command identifying the endpoint device 106 to the switch 104. For example, the blackhole command may comprise the device identifier for the endpoint device 106. The switch 104 is configured to transform the destination traffic associated with the endpoint device 106 to a null destination in response to receiving the blackhole command. In another embodiment, the switch 104 is configured to discard traffic associated with the endpoint device 106 in response to receiving the blackhole command.

In another embodiment, the threat management server 112 sends a disable command identifying the endpoint device 106 to the switch 104. The switch 104 is configured to disable the port on the switch 104 that the endpoint device 106 is connected to in response to receiving the disable command. For example, the switch 104 may logically disable the port or transition the port to an inactive state. In another embodiment, the switch 104 is configured to disconnect electrical power to the port on the switch 104 that the endpoint device 106 is connected to in response to receiving the disable command. For example, the switch 104 may actuate an electronic switch to disconnection electrical power to the port. In other examples, the switch 104 may disable the port using any other suitable technique as would be appreciated by one of ordinary skill in the art.

In other embodiments, the threat management server 112 may block the endpoint device 106 from accessing the communications network 102 using any other suitable technique as would be appreciated by one of ordinary skill in the art.

In one embodiment, the threat management server 112 adds the endpoint device 106 to a blacklist 214 in response to blocking the endpoint device 106 from accessing the communications network 102. In some embodiments, adding the endpoint device 106 to the blacklist 214 triggers the NAS 108 to automatically fail authentication for the endpoint device 106 the next time the endpoint device 106 connects to the switch 104.

In one embodiment, the threat management server 112 sends an alert identifying the endpoint device 106 in response to blocking the endpoint device 106 from accessing the communications network 102. In one embodiment, a user can request to receive alerts based on user defined rules or criteria. For example, a user may request to receive an alert when an endpoint device 106 with a MAC address within a particular range of MAC addresses is blocked from accessing the communications network 102. User defined rules may include, but are not limited to, device identifiers, MAC addresses, IP address, port addresses, device manufactures, vendors, any other suitable criteria, and/or combinations of criteria. The user may also provided delivery preferences that define how the alert should be sent. For example, a user may request alerts via email, text, or any other suitable delivery technique. The threat management server 112 sends the alert to the user in accordance with the user defined rules and delivery preferences.

Figure 4:
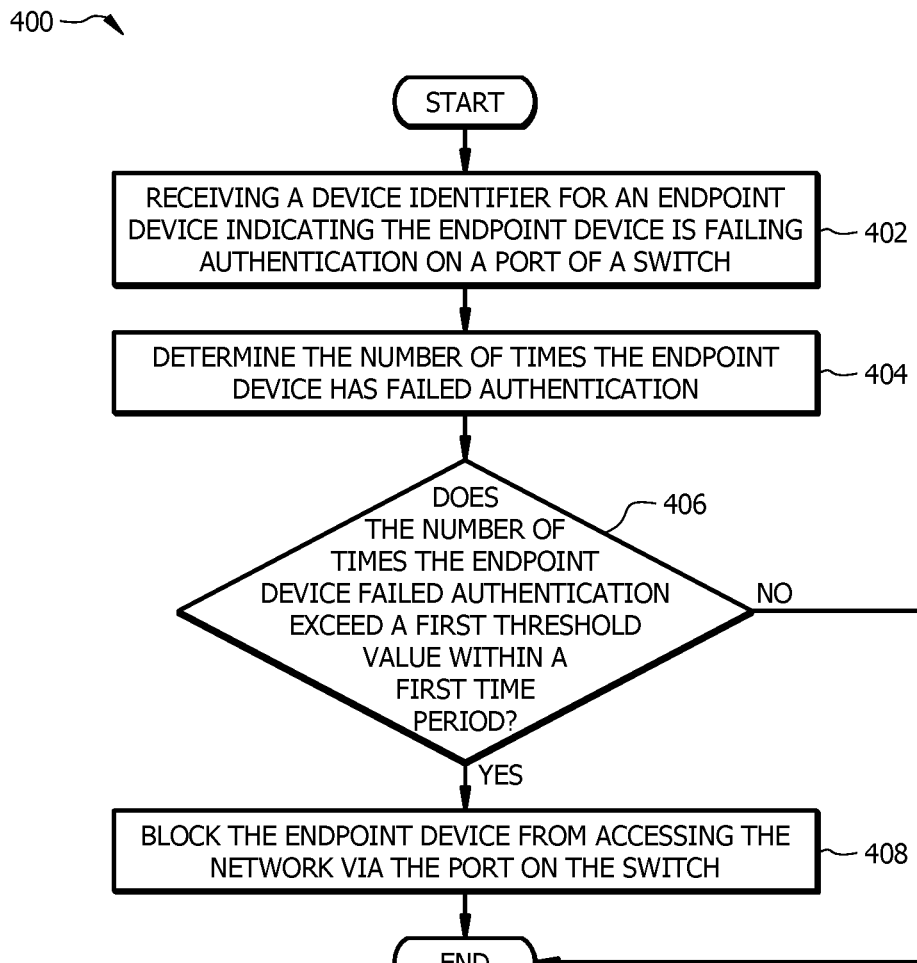
FIG. 4 is a flowchart of an embodiment of a device removal method for repeat offenders.

FIG. 4 is a flowchart of an embodiment of a device removal method 400 for repeat offenders. Method 400 is implemented by the threat management server 112 to identify and block malicious or undesirable endpoint devices 106 that attempt to reconnect to the communications network 102.

Similar to the example described in FIG. 3, conventional systems are unable to identify and block endpoint devices 106 that do not pass authentication. In contrast, system 100 provides a mechanism for identifying and blocking the malicious endpoint device 106 from accessing the communications network 102 using knowledge that the endpoint device 106 has previously been blocked from the communications network 102.

A non-limiting example is provided to illustrate how the threat management server 112 implements method 400 to identify and block an endpoint device 106 from accessing the communications network 102. As an example, a bad actor reconnects an endpoint device 106 that has been previously blocked from the communications network 102 to a port on a switch 104. In this example, the NAS 108 attempts to authenticate the endpoint device 106, but the endpoint device 106 fails authentication with the NAS.

At step 402, the threat management server 112 receives a device identifier for an endpoint device 106 indicating the endpoint device 106 is failing authentication on a port of a switch 104. Receiving the device identifier for the endpoint device 106 may be performed using a process similar to the process describe in step 302 of FIG. 3. In one embodiment, the NAS 108 sends a device identifier for the endpoint device 106 to the threat management server 112 in response to the endpoint device 106 failing authentication. For example, the device identifier for the endpoint device 106 may comprise the MAC address for the endpoint device 106. In another embodiment, the threat management server 112 may request information about the endpoint device 112 from the NAS 108 and/or the database 110.

At step 404, the threat management server 112 determines the number of times the endpoint device 106 has failed authentication with the NAS 108 within a first time period. Determining the number of times the endpoint device 106 has failed authentication within the first time period may be performed using a process similar to the process describe in step 306 of FIG. 3. For example, the threat management server 112 may count the number of times the endpoint device 106 appears in the device log file 216 as failing authentication with the NAS 108 within the first time period. The first time period may be any predetermined amount of time.

At step 406, the threat management server 112 determines whether the number of times the endpoint device 106 has failed authentication exceeds a first threshold value within the first time period. Determining the whether the number of times the endpoint device 106 has failed authentication exceeds the first threshold value within the first time period may be performed using a process similar to the process describe in step 308 of FIG. 3. For example, the threat management server 112 may determine whether the endpoint device 106 has failed authentication at least once times within the past hour. The threat management server 112 compares the number of times the endpoint device 106 has failed authentication within the first time period (e.g. 1 hour) to the first threshold value (e.g. one). In other examples, the threat management server 112 may use any other suitable value for the first threshold value. The threat management server 112 proceeds to step 408 when the threat management server 112 determines that the number of times the endpoint device 106 has failed authentication exceeds the first threshold value within the first time period. The threat management server 112 terminates method 400 when the threat management server 112 determines that the number of times the endpoint device 106 has failed authentication does not exceed the first threshold value within the first time period.

At step 408, the threat management server 112 blocks the endpoint device 106 from accessing the communications network 102 via the port of the switch 104. The threat management server 112 may block the endpoint device 106 using a process similar to the process described in step 316 of FIG. 3.

Figure 5:
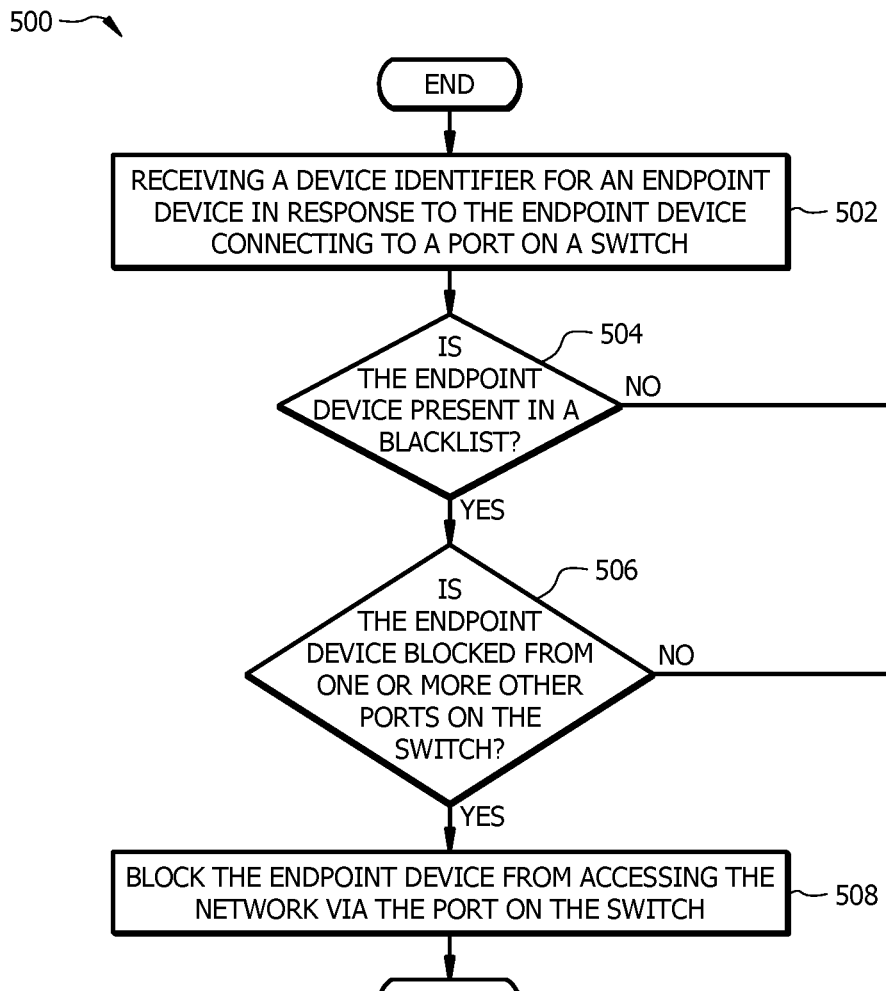
FIG. 5 is a flowchart of an embodiment of a device removal method for port switching devices.

FIG. 5 is a flowchart of an embodiment of a device removal method 500 for port switching devices. Method 500 is implemented by a threat management server 112 to identify and block malicious or undesirable endpoint devices 106 that attempt to switch ports on a switch 104 to reconnect to the communications network 102.

A non-limiting example is provided to illustrate how the threat management server 112 implements method 500 to identify and block an endpoint device 106 from accessing the communications network 102 by switching ports on a switch 104 after the endpoint device 106 has previously been blocked from another port of the switch 104. As an example, a bad actor reconnects an endpoint device 106 that has been previously blocked from one of the ports of a switch 104 to another port on the switch 104. In this example, the bad actor may attempt to reconnect an endpoint device 106 to different ports on a switch 104 after being blocked from one or more other ports on the switch 104. Similar to the example described in FIG. 3, conventional systems are unable to identify and block endpoint device 106 that do not pass authentication. In addition, conventional systems are also unable to track endpoint devices 106 that switch ports on a switch 104. In contrast, system 100 provides a mechanism for tracking and blocking the malicious endpoint device 106 from accessing the communications network 102 even if the endpoint device 106 keeps switching ports on a switch 104.

At step 502, the threat management server 112 receives a device identifier for an endpoint device 106 in response to the endpoint device 106 connecting to a port on a switch 104. Receiving the device identifier for the endpoint device 106 may be performed using a process similar to the process describe in step 302 of FIG. 3. In one embodiment, the NAS 108 sends a device identifier for the endpoint device 106 to the threat management server 112 in response to the endpoint device 106 connecting to a port on the switch. For example, the device identifier for the endpoint device 106 may comprise the MAC address for the endpoint device 106. In another embodiment, the threat management server 112 may request information about the endpoint device 112 from the NAS 108 and/or database 110.

At step 504, the threat management server 112 determines whether the endpoint device 106 is present in a blacklist 214. For example, the threat management server 112 may use the device identifier (e.g. MAC address) to look-up whether the endpoint device 106 is present in the blacklist 214. The threat management system 112 determines that the endpoint device 106 has previously been blocked from accessing the communications network 102 when the endpoint device 106 is present in the blacklist 214. The threat management engine 112 proceeds to step 506 when the endpoint device 106 is present in the blacklist 214. The threat management system 112 determines that the endpoint device 106 has not been previously blocked from accessing the communications network 102 when the endpoint device 106 is not present in the blacklist 214. The threat management engine 112 terminates method 500 when the endpoint device 106 is not present in the blacklist 214.

At step 506, the threat management server 112 determines whether the endpoint device 106 is blocked from one or more other ports on the switch 104. The blacklist 214 comprises information indicating ports on a switch 104 that the endpoint device 106 has been blocked from. The threat management server 112 uses information from the blacklist 214 to determine whether the endpoint device 106 has previously been blocked from one or more other ports on the switch 104. In one embodiment, the threat management server 112 determines whether the endpoint device 106 has been blocked from one or more other ports on the switch 104 within a predetermined time period, for example, the past 24 hours. The threat management server 112 proceeds to step 508 when the endpoint device 106 is blocked from one or more other ports on the switch 104. The threat management engine 112 proceeds to step 510 when the endpoint device 106 is not blocked from any other ports on the switch 104.

At step 508, the threat management server 112 blocks the endpoint device 106 from accessing the communications network 102 via the first port of the switch 104. The threat management server 112 may block the endpoint device 106 using a process similar to the process described in step 316 of FIG. 3.

Figure 6:
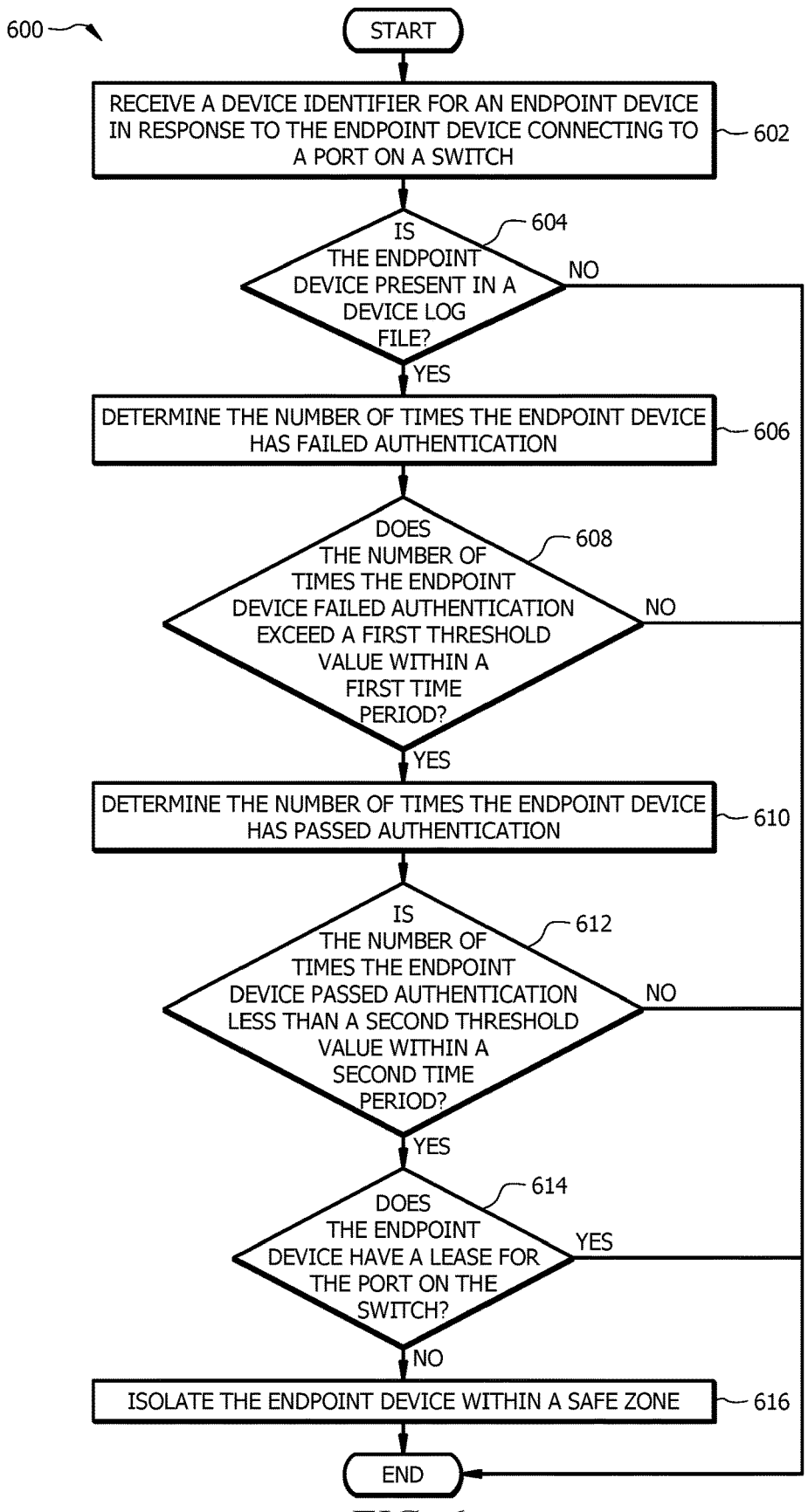
FIG. 6 is a flowchart of an embodiment of a device isolating method.

FIG. 6 is a flowchart of an embodiment of a device isolating method 600. Method 600 is implemented by the threat management server 112 to identify and track malicious or undesirable endpoint devices 106 that are connected to a switch 104 in the communications network 102 and to isolate these endpoint devices 106 within a safe zone in the communications network 102.

A non-limiting example is provided to illustrate how the threat management server 112 implements method 600 to identify and isolate an endpoint device 106 within a safe zone in the communications network 102. As an example, a bad actor connects a malicious endpoint device 106 to a port on a switch 104. Similar to the example described in FIG. 3, conventional systems are unable to identify and communicate with endpoint device 106 that do not pass authentication. In addition, conventional systems are also unable to isolate or monitor an endpoint device 106 without exposing the communications network 102 to malicious activities such as data exfiltration. In contrast, system 100 provides a mechanism for identifying, isolating, and monitoring the malicious endpoint device 106 within a safe zone in the communications network 102. In this example, system 100 safely keeps the malicious endpoint device 106 engaged while collecting information about the malicious endpoint device 106 and/or its activity.

At step 602, the threat management server 112 receives a device identifier for an endpoint device 106 in response to the endpoint device 106 connecting to a port on a switch 104. Receiving the device identifier for the endpoint device 106 may be performed using a process similar to the process describe in step 302 of FIG. 3. In one embodiment, the NAS 108 sends a device identifier for the endpoint device 106 to the threat management server 112 in response to the endpoint device 106 connecting to the port on the switch 104. For example, the device identifier for the endpoint device 106 may comprise the MAC address for the endpoint device 106. In another embodiment, the threat management server 112 may request information about the endpoint device 112 from the NAS 108 and/or database 110.

At step 604, the threat management server 112 determines whether the endpoint device 106 is present in a device log file 216. For example, the threat management server 112 may use the device identifier (e.g. MAC address) to look-up whether the endpoint device 106 is present in the device log file 216. The presence of the endpoint device 106 in the device log file 216 indicates that historical information about whether the endpoint device 106 has previously failed or passed authentication with the NAS 108 is available. The threat management server 112 proceeds to step 606 when the threat management server 112 determines that the endpoint device 106 is present in the device log file 216. The absence of the endpoint device 106 in the device log file 216 indicates that historical information about whether the endpoint device 106 has previously failed or passed authentication with the NAS 108 may not be available. The threat management server 112 terminates method 600 when the threat management server 112 determines that the endpoint device 106 is not present in the device log file 216.

At step 606, the threat management server 112 determines the number of times the endpoint device 106 has failed authentication with the NAS 108 within a first time period using the device log file 216. Determine the number of times the endpoint device 106 has failed authentication with the NAS 108 may be performed using a process similar to the process describe in step 306 of FIG. 3. For example, the threat management server 112 may count the number of times the endpoint device 106 appears in the device log file 216 as failing authentication with the NAS 108 within the first time period. The first time period may be any predetermined amount of time.

At step 608, the threat management server 112 determines whether the number of times the endpoint device 106 has failed authentication exceeds a first threshold value within the first time period. Determining whether the number of times the endpoint device 106 has failed authentication exceeds the first threshold within the first time period may be performed using a process similar to the process describe in step 308 of FIG. 3. For example, the threat management server 112 may determine whether the endpoint device 106 has failed authentication at least ten times within the past 15 minutes. The threat management server 112 compares the number of times the endpoint device 106 has failed authentication within the first time period (e.g. 15 minutes) to the first threshold value (e.g. 10). In other examples, the threat management server 112 may use any other suitable value for the first threshold value. The threat management server 112 proceeds to step 610 when the number of times the endpoint device 106 has failed authentication exceeds the first threshold value. The threat management server 112 terminates method 600 when the number of times the endpoint device 106 has failed authentication does not exceed the first threshold value.

At step 610, the threat management server 112 determines the number of times the endpoint device 106 has passed authentication with the NAS 108 within a second time period using the device log file 216. Determining the number of time the endpoint device 106 has passed authentication with the NAS 108 may be performed using a process similar to the process describe in step 310 of FIG. 3. For example, the threat management server 112 may count the number of times the endpoint device 106 appears in the device log file 216 as passing authentication with the NAS 108 within the second time period. The second time period may be any predetermined amount of time. In one embodiment, the second time period is a greater period of time than the first time period. For example, the first time period may be one hour and the second time period may be twenty four hours.

At step 612, the threat management server 112 determines whether the number of times the endpoint device 106 has passed authentication is less than a second threshold value within the second time period. Determining whether the number of times the endpoint device 106 has passed authentication is less than the second threshold value within the second time period may be performed using a process similar to the process describe in step 312 of FIG. 3. For example, the threat management server 112 may determine whether the endpoint device 106 has passed authentication at least twice within the past 24 hours. The threat management server 112 compares the number of times the endpoint device 106 has passed authentication within the second time period to the second threshold value. In other examples, the threat management server 112 may use any other suitable value for the second threshold value. The threat management server 112 proceeds to step 614 when the number of times the endpoint device 106 has passed authentication is less than the second threshold value. The threat management server 112 terminates method 600 when the number of times the endpoint device 106 has passed authentication is at least the second threshold value.

At step 614, the threat management server 112 determines whether the endpoint device 106 has a lease for the port on the switch 104. Determining whether the endpoint device has a lease for the port on the switch 104 may be performed using a process similar to the process describe in step 314 of FIG. 3. For example, the threat management server 112 may use the device identifier (e.g. MAC address) with the port lease log file 218 to look-up and determine whether the endpoint device 106 has a lease for the port on the switch 104. The threat management server 112 proceeds to step 616 when the threat management server 112 determines that the endpoint device 106 does not have a lease on the port of the switch 104. The threat management server 112 terminates method 600 when the threat management server 112 determines that the endpoint device 106 has a lease on the port of the switch 104.

At step 616, the threat management server 112 isolates the endpoint device 106 within a safe zone in the communications network 102. In one embodiment, the threat management server 112 sends a reroute command identifying the endpoint device 106 to the switch 104. For example, the reroute command may comprise the device identifier for the endpoint device 106. The switch 104 is configured to transform the destination of traffic associated with the endpoint device 106 to a safe zone in response to receiving the reroute command. Transferring the traffic associated with the endpoint device 106 to the safe zone allows the endpoint device 106 to be monitored and recorded in a low-risk environment without jeopardizing the system 100 and communications network 102.

In one embodiment, the safe zone is an empty port on the switch 104. For example, the switch 104 may reconnect the endpoint device 106 to a port that is not connected to any other devices. In another embodiment, the safe zone is a port on the switch 104 that is connected to devices with a threat level below a threat level threshold. The switch 104 may determine a threat level for a device based on its vulnerability to malicious attacks. Devices that are more vulnerable to an attack have a higher threat level than devices that are less vulnerable to an attack. For instance, a database or memory is more vulnerable and has a higher threat level than an IP phone or printer. The switch 104 may use any suitable technique for determining and assigning threat levels for devices.

In one embodiment, the switch 104 is configured to reduce or limit the bandwidth and/or throughput of the port on the switch 104 connected to the endpoint device 106. For example, the switch 104 may issue one or more commands to reduce or limit the speed of the port. The switch 104 may set the port speed to a particular value (e.g. 10 Mbps or 56 Kbps) or may set the port speed to a percentage of the maximum speed of the port (e.g. 10%) of the maximum bandwidth). As another example, the switch 104 may issues one or more commands to limit the amount of data that can communicated by the port. For instance, the switch 104 may set a limit (e.g. 100 MB) for how much data can be communicated by the port within a predetermined time interval (e.g. one hour). In other examples, the switch 104 may limit both the bandwidth and throughput of the port.

In one embodiment, data traffic for the endpoint device 106 is recorded and/or monitored in the safe zone. Traffic for the endpoint device 106 may be identified and monitored based on its MAC address, IP address, or any other suitable information. The threat management server 112 performs a forensic analysis on the recorded traffic associated with the endpoint device 106 to identify activity, behavior, and/or patterns by the endpoint device 106 that may be used to increase the security of the system 100. For example, a forensic analysis may identify activity that can be used by the system (e.g. threat management server 112) to identify other potentially malicious endpoint devices 106.

In one embodiment, the threat management server 112 adds the endpoint device 106 to a blacklist 214 in response to blocking the endpoint device 106 from accessing the communications network 102. In some embodiments, adding the endpoint device 106 to the blacklist 214 triggers the NAS 108 to automatically fail authentication for the endpoint device 106 the next time the endpoint device 106 connects to the switch 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A threat management server comprising:
    a memory configured to store:
        a blacklist identifying:
            one or more endpoint devices blocked from accessing a network;
            block timeout periods indicating an amount of time each of the one or more endpoint devices is blocked from a switch; and
            ports each of the one or more endpoint devices have been blocked from;
    a threat management engine implemented by a processor configured to:
        receive a device identifier for an endpoint device in response to the endpoint device changing its connection to the switch from a first port on the switch to a second port on the switch;
        determine the endpoint device is present in the blacklist based on the device identifier in response to receiving the device identifier;
        determine the endpoint device is blocked from the first port on the switch based on information in the blacklist;
        block the endpoint device from accessing the network via the second port on the switch in response to determining the endpoint device is blocked from the first port on the switch; and
        increase a block timeout period associated with the endpoint device in response to blocking the endpoint device.

2. The device of claim 1, wherein:
    blocking the endpoint device from accessing the network comprises sending a blackhole command to the switch identifying the endpoint device; and
    the blackhole command triggers the switch to transform the destination of traffic associated with the endpoint device to a null destination in response to receiving the blackhole command.

3. The device of claim 1, wherein:
    blocking the endpoint device from accessing the network comprises sending a blackhole command to the switch identifying the endpoint device; and
    the blackhole command triggers the switch to discard traffic associated with the endpoint device in response to receiving the blackhole command.

4. The device of claim 1, wherein:
    blocking the endpoint device from accessing the network comprises sending a disable command to the switch identifying the endpoint device; and the disable command triggers the switch to disable the port the endpoint device is connected to in response to receiving the disable command.

5. The device of claim 1, wherein the threat management engine is configured to send an alert identifying the endpoint device in response to blocking the endpoint device from accessing the network.

6. The device of claim 1, wherein the threat management engine is configured to capture device information for the endpoint device in response to blocking the endpoint device from accessing the network.

7. The device of claim 1, wherein determining the endpoint device is blocked from the first port on the switch comprises determining that the endpoint device was blocked from the first port within a predetermined time period.

8. An information security method comprising:
receiving, by a threat management server, a device identifier for an endpoint device in response to the endpoint device changing its connection to a switch from a first port on the switch to a second port on the switch;
determining, by the threat management server, the endpoint device is present in a blacklist based on the device identifier in response to receiving the endpoint device identifier, wherein the blacklist identifies:
one or more endpoint devices blocked from accessing a network;
block timeout periods indicating an amount of time each of the one or more endpoint devices is blocked from the switch; and
ports on the switch each of the one or more endpoint devices have been blocked from;
determining, by the threat management server, the endpoint device is blocked from the first port on the switch based on information in the blacklist;
blocking, by the threat management server, the endpoint device from accessing the network via the second port on the switch in response to determining the endpoint device is blocked from the first port on the switch; and
increasing, by the threat management server, a block timeout period associated with the endpoint device in response to blocking the endpoint device.

9. The method of claim 8, wherein:
blocking the endpoint device from accessing the network comprises sending a blackhole command to the switch identifying the endpoint device; and
the blackhole command triggers the switch to transform the destination of traffic associated with the endpoint device to a null destination in response to receiving the blackhole command.

10. The method of claim 8, wherein:
blocking the endpoint device from accessing the network comprises sending a blackhole command to the switch identifying the endpoint device; and
the blackhole command triggers the switch to discard traffic associated with the endpoint device in response to receiving the blackhole command.

11. The method of claim 8, wherein:
blocking the endpoint device from accessing the network comprises sending a disable command to the switch identifying the endpoint device; and
the disable command triggers the switch to disable the port the endpoint device is connected to in response to receiving the disable command.

12. The method of claim 8, further comprising sending, by the threat management server, an alert identifying the endpoint device in response to blocking the endpoint device from accessing the network.

13. The method of claim 8, further comprising capturing, by the threat management server, device information for the endpoint device in response to blocking the endpoint device from accessing the network.

\* \* \* \* \*